United States Patent [19]

Nelson

[11] Patent Number: 5,230,800
[45] Date of Patent: Jul. 27, 1993

[54] SCRIM INSERTED ELECTROSTATIC FIBROUS FILTER WEB

[75] Inventor: David L. Nelson, Zundert, Netherlands

[73] Assignee: Minnesota Mining and Manufacturing Company, Saint Paul, Minn.

[21] Appl. No.: 839,110

[22] Filed: Feb. 20, 1992

[51] Int. Cl.[5] ............................................. B01D 39/04
[52] U.S. Cl. ..................................... 210/496; 210/505; 264/22
[58] Field of Search ......................... 204/168; 264/22; 210/490, 505, 496

[56] References Cited

U.S. PATENT DOCUMENTS

| | | |
|---|---|---|
| Re. 30,782 | 10/1981 | van Turnhout ........................ 264/22 |
| Re. 31,285 | 6/1983 | van Turnhout et al. ............. 55/155 |
| 4,215,682 | 8/1980 | Kubik et al. ..................... 128/205.29 |
| 4,363,682 | 12/1982 | Thiebault ............................. 156/181 |
| 4,456,648 | 6/1984 | Adamse et al. ..................... 428/283 |
| 4,588,537 | 5/1986 | Klaase et al. ......................... 264/22 |
| 4,592,815 | 6/1986 | Nakao ............................. 204/168 X |
| 4,623,438 | 11/1986 | Felton et al. ......................... 204/168 |
| 4,789,504 | 12/1988 | Ohmori et al. ......................... 264/22 |
| 4,874,399 | 10/1989 | Reed et al. ....................... 55/155 X |

*Primary Examiner*—Frank Spear
*Attorney, Agent, or Firm*—Gary L. Griswold; Roger R. Tamte; William J. Bond

[57] ABSTRACT

Provided is a nonwoven web of electrically charged fibers needle-punched to a scrim support. This web provides a filter medium having increased uniformity in pressure-drop, basis weight and filtration performance.

12 Claims, 2 Drawing Sheets

SCRIM INSERTED ELECTROSTATIC FIBROUS FILTER WEB

BACKGROUND AND FIELD OF THE INVENTION

The present invention relates to a process for forming an electret nonwoven filter and products of such a process.

Nonwoven webs of electret fibers are typically formed of loosely associated fibers. The filters can be electrostatically charged prior to, during, or after, being formed in to a nonwoven web. For example, post-formation charging is described in U.S. Pat. No. 4,588,537 which charges a lofty nonwoven web formed by a variety of methods including carding and melt blowing. The webs are charged while under compression and then permitted to return to their original loft. This patent states that precharged fibers are preferably bipolar so that they tend to resist crimping which is avoided by pre-crimping when using the charging method of this patent.

Fibers can also be charged while they are being formed, as disclosed in Kubik et al., U.S. Pat. No. 4,215,682, where melt-blown fibers are bombarded by ions or electrons immediately after being extruded from the melt-blowing orifices. The fibers solidify extremely rapidly in the atmosphere and are collected as a semi-coherent mass of entangled microfibers. The webs are described as preferably open to provide a low pressure drop for liquid passing through the filter.

A particularly effective method of forming a nonwoven electret fiber filter is described in U.S. Reissue Pat. No. 30,782 (Van Turnout et al.). The electret fibers in this patent are formed from a corona charged film that is fibrillated to form the charged fibers. The charged fibers can then be formed into a nonwoven web by common methods such as carding or air laying. This charging method provides a particularly high density of injected charges. However, problems are encountered with forming webs from these precharged fibers. The fibers are generally quite large and uncrimped. They also have a resistance to bending. Due in part to these properties, the fibers resist formation into a uniform coherent web, particularly at low basis weights. This problem is partially addressed in U.S. Pat. No. 4,363,682, which proposes the use of such filibrated fiber webs in face mask applications. In order to provide a more coherent web, as well as one that resists shedding fibers, this patent proposes a post-embossing treatment. This post-embossing welds the outer surface fibers together allegedly providing a more coherent and comfortable web for use as a face mask. However, this treatment will also tend to result in a more condensed web, which would increase pressure loss over the filter.

BRIEF DESCRIPTION OF THE INVENTION

A uniform electret fiber web filter is obtained by forming a web of charged fibers, placing the charged fiber web onto an open, substantially non-extensible, scrim support material, and then needle-punching the composite material to provide a highly uniform filter web.

DETAILED DESCRIPTION OF THE PREFERRED EMBODIMENTS

Figure 1:
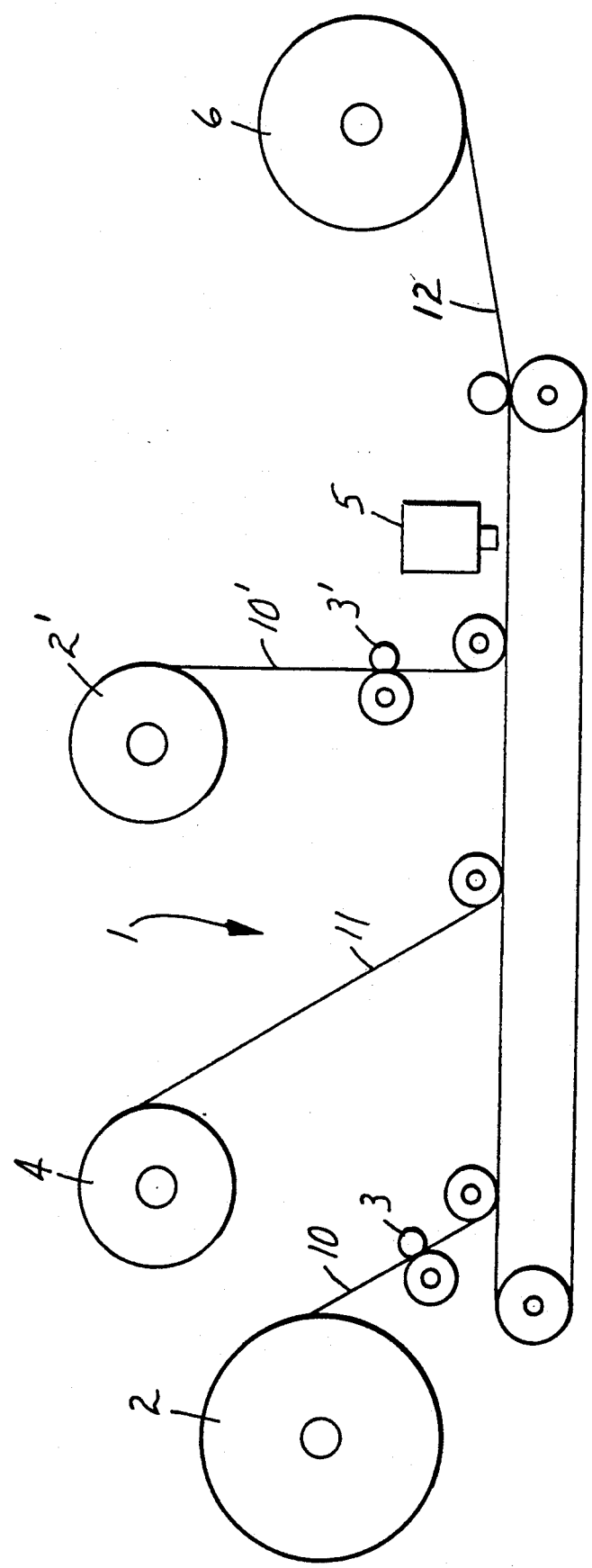
FIG. 1 is a schematic representation of a preferred process arrangement according to the invention method.

FIG. 1 represents an apparatus arrangement 1 for practicing the present invention. The fibrillated fibers are formed into a nonwoven web 10 by card 2. The web can then be feed to a randomizer 3 to increase basis weight. The randomizer would typically be a set of intermeshing metallic wire (e.g., V-grooves) rollers. Additionally, a second web (not shown) could be taken off card 2, treated likewise, and then joined to web 10. This allows for greater flexibility in the choice of basis weights. The scrim 11 is fed from a supply roll 4 onto the filter web 10. However, the scrim 11 could also be fed upstream of the card 2' so that the web 10" is laid onto the scrim 11. In a preferred arrangement, a second card 2' is used so that the scrim is a center layer between two outer nonwoven filter layers. This is shown in FIG. 1 by a second card arrangement with identical numbering. Likewise, a second web could be taken off card 2' and joined to web 10'. The two webs 10 and 10' can be of differing basis weights. The use of two webs provides particularly uniform filter webs of low variability.

The precharged fibers are preferably formed by the method described in U.S. Patent Reissue Nos. 30,782 and 31,285. The fibers, as such, are formed from an electrostatically charged (e.g., by a corona discharge electrode) film that has been fibrillated to provide fibers with a substantially rectangular cross-section.

The web 10 and scrim 11 are then fed to a needling station 5 where the web 10 is joined to the scrim by the action of the needles to form the filter web 12. The needles will preferably penetrate a web layer first to transversely displace fibers securely down into the scrim and promote the fibers to interlock the scrim, and in the preferred arrangement with fibers of an underlying web $10^1$. The needles can be arranged to penetrate the filter web 12 composite between about 10 and 300 penetrations per $cm^2$. However, higher needling densities tend to compact the filter web 12, increasing pressure loss through the filter. Preferably, the needling is less than 75 penetrations per $cm^2$. The needle-punched joined composite is then collected on take-up roll 6 for subsequent converting.

Webs typically formed from carding operations are anisotropic with larger amounts of fiber orientation in the machine direction, which generally allows for web-handling stability in this direction. However, lower basis weight webs are less easily handled. A practice in the past to improve nonwoven handleability has been to needle-punch the webs to increase interfiber bonding. However, generally this has been found to be disruptive to electret web uniformity. This disruption in web uniformity has been found to be particularly problematic when a randomizer is used to increase the web nominal basis weight.

Unexpectedly, it has been found that the use of needle-punching treatments on an electret fibrillated nonwoven web can significantly increase the electret web uniformity when the web is needled to an underlying scrim support. Particularly good uniformity results are obtained where two webs are needled to a scrim between the two webs. The coefficient of variability of these scrim supported filter webs decreases remarkably compared to similar webs prepared without the scrim support.

The scrim material can be any known reinforcement scrim, woven or nonwoven. Nonwoven scrims are generally preferred in terms of cost and degree of openness. The scrim material is also preferably polymeric, and for purposes of recyclability, preferably formed of a polymer compatible with the material of the electret nonwoven web. A scrim of nonwoven material will generally be treated to increase tensile properties such as by thermoembossing, calandaring, sonic bonding, binder fibers or the like. A typical scrim material would be a spunbond polypropylene nonwoven web.

The precharged electret fibers are preferably formed from a dielectric film that is capable of being corona charged and then fibrillated. Suitable film forming materials include polyolefins, such as polypropylene, linear low density polyethylene, poly-1-butene, polytetrafluoroethylene, polytrifluorochloroethylene; or polyvinylchloride; aromatic polyarenes; such as polystyrene; polycarbonates; polyesters; and copolymers and blends thereof. Preferred are polyolefins free of branched alkyl radicals and copolymers thereof. Particularly preferred are polypropylene and polypropylene copolymers. Various functional additives known in the art can be blended with the dielectric polymers or copolymers such as poly(4-methyl-1-pentene) as taught in U.S. Pat. No. 4,874,399, a fatty acid metal salt, as disclosed in U.S. Pat. No. 4,789,504, or particulates, as per U.S. Pat. No. 4,456,648.

The disclosed process is also seen as applicable to other methods of forming charged fibers into webs include air laying, electrostatic deposition, Rando webs and the like. Like problems with forming charged fibers into uniform webs are encountered with these web formation methods.

EXAMPLES

A fibrillated nonwoven fiber web was made according to the apparatus described in FIG. 1 using a randomizer and a scrim (Examples C1-C5). The scrim was sandwiched between two webs from cards 2 and $2^1$. The fibers were polypropylene fibrillated electrets formed according to U.S. Re No. 30,782. These webs were compared to similar webs without an inserted scrim. The inserted scrim was a commercially available spunbonded fleece with a basis weight of about 10 gram/m$^2$ (Lutrasil TM, available from Karl Freudenberg, Kaiserslautern, Germany).

The basis weight (BW) of the webs were determined by weighing a disc with an area of 100 cm$^2$ and converted to grams/m$^2$. The penetration and the pressure drop of the media was measured on a TSI Automatic Filter Testing machine type 8110, TSI Inc., Minneapolis, Minn., based on a test area of 50 cm$^2$ and an air velocity of 0.2 m/s. The air contained an NaCl aerosol where the penetration is the ratio of NaCl concentration downstream and upstream of the filter divided by 100. The Coefficient of Variation (COV), defined as the ratio of the standard deviation and the basis weight, was calculated from a sampling of web properties of at least 76 locations on the web. The results are given in Tables 1 and 2.

The Quality Factor Q is defined mathematically by the expression $$Q = \frac{-\ln(\% \ P/100)}{\Delta P}$$

were %P is the percent penetration, $\Delta P$ is the pressure drop is Pascal, and ln indicates the natural logarithm. This value is always positive and increases with reduced penetration. Conversely, as pressure drop increases, the Q value is reduced. Q is generally an index which is independent of the basis weight. Thus, Q may be used to compare the filtration performance of webs of different basis weights.

TABLE I

| Example | Average g/m$^2$ | Average Q 1/Pa | Average $\Delta P$ | Average % P | % COV BW | % COV $\Delta P$ | % COV % P |
|---|---|---|---|---|---|---|---|
| 1 | 60.2 | 0.21 | 5.0 | 17.90 | 5.6 | 9.7 | 8.7 |
| 2 | 93.6 | 0.19 | 10.0 | 15.80 | 5.1 | 8.2 | 7.0 |
| 3 | 153.7 | 0.15 | 23.10 | 3.39 | 2.8 | 6.7 | 13.9 |
| 4 | 207.9 | 0.14 | 31.5 | 1.39 | 4.1 | 6.7 | 20.9 |
| 5 | 260.8 | 0.11 | 45.2 | 0.58 | 3.7 | 6.0 | 13.6 |

TABLE II

| Type | ave. BW$^1$ g/m$^2$ | % COV BW | Ave % P | % COV % P | $\Delta P$ Pa | % COV $\Delta P$ | Avg Q, 1/Pa |
|---|---|---|---|---|---|---|---|
| 6 | 54.63 | 3.15 | 28.76 | 5.1 | 5.2 | 3.2 | 0.24 |
| 7 | 94.57 | 3.4 | 12.89 | 7.3 | 8.0 | 6.9 | 0.26 |
| 8 | 143.00 | 2.8 | 4.00 | 11.2 | 15.1 | 7.9 | 0.21 |
| 9 | 191.63 | 3.0 | 1.65 | 12.2 | 25.2 | 5.4 | 0.16 |
| 10 | 205.79 | 1.8 | 1.28 | 10.9 | 27.5 | 2.9 | 0.16 |
| 11 | 244.07 | 3.4 | 0.65 | 17.5 | 36.5 | 6.7 | 0.14 |
| C1 | 64.7 | 8.7 | 29.0 | 16.8 | 4.4 | 15.9 | 0.29 |
| C2 | 112.63 | 6.7 | 8.97 | 20.1 | 9.1 | 15.7 | 0.27 |
| C3 | 153.17 | 4.2 | 3.31 | 23.6 | 15.9 | 12.6 | 0.21 |
| C4 | 191.20 | 4.5 | 1.91 | 33.0 | 24.3 | 10.1 | 0.16 |
| C5 | 242.06 | 5.4 | 1.33 | 24.0 | 36.2 | 7.1 | 0.12 |

$^1$The basis weights were adjusted to exclude the nonwoven scrim.

Figure 2:
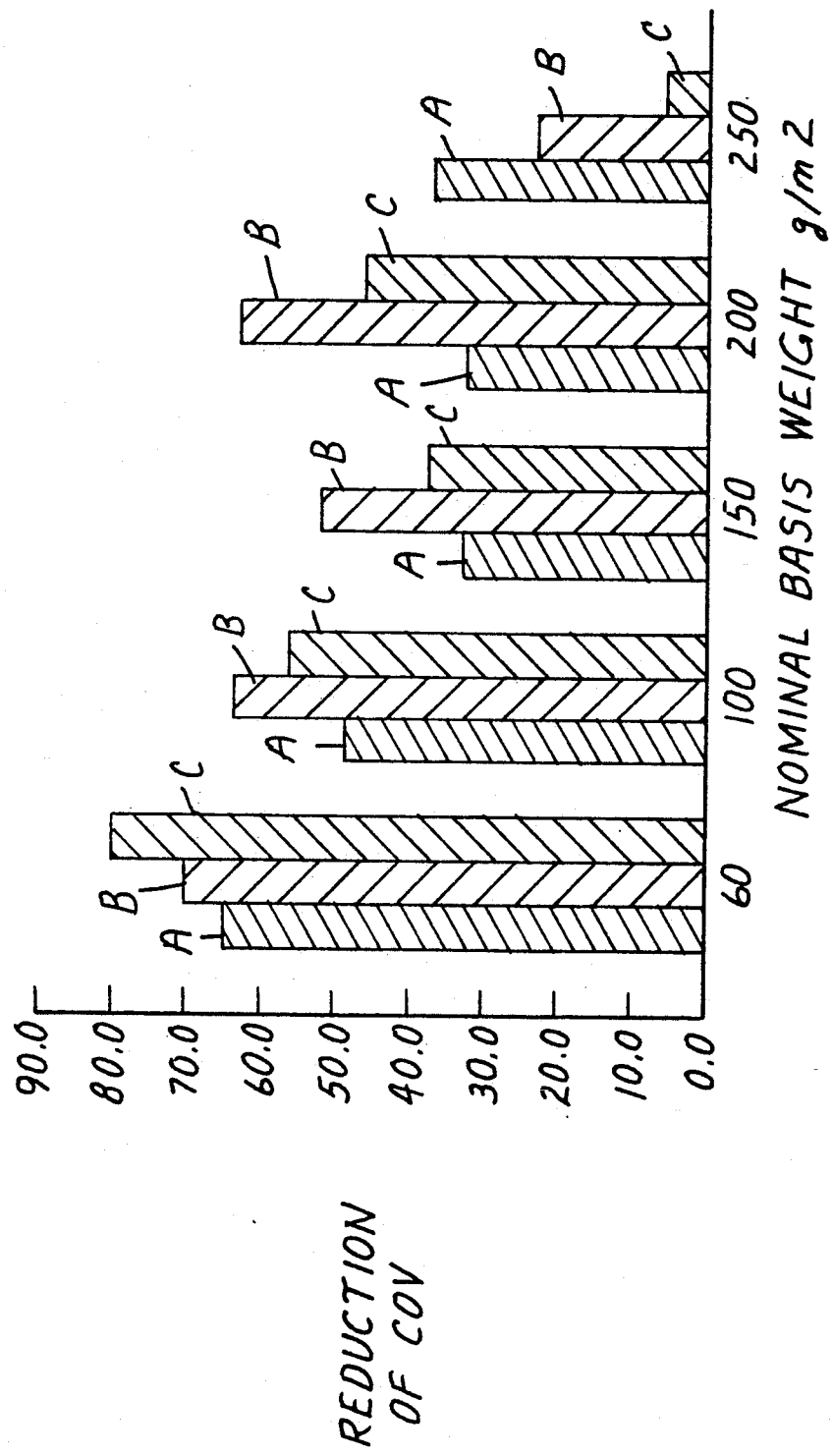
FIG. 2 is a plot of percent reduction in three properties coefficient of variability versus nominal basis weight for invention filters and comparable filters without the use of scrims.

The COV values for comparable basis weight webs decreased significantly for the invention examples webs 1-11 compared to similar webs produced without reinforcement scrims (Comparative example C1-C5). The most significant reductions in COV values were noted for lower basis weight webs (e.g., less than about 120 g/m$^2$). This improvement is graphically summarized in FIG. 2 where the y axis represents the % reduction in COV of the scrim inserted examples compared to the non-scrim examples. The x axis designates the nominal basis weights of the webs compared. The A columns represent the basis weight, the B columns the penetration, and the C columns the pressure drop.

The various modifications and alterations of this invention will be apparent to those skilled in the art without departing from the scope and spirit of this invention, and this invention should not be restricted to that set forth herein for illustrative purposes.

I claim:

1. A method for forming an electret nonwoven filter web comprising the steps of
   a) providing electrostatically charged, dielectric, fibrillated discontinuous fibers formed by fibrillating an electrostatically charged film,
   b) forming the electrostatically charged discontinuous fibers into at least one nonwoven filter web,
   c) joining the at least one filter web to a reinforcement scrim, and
   d) consolidating the at least one filter web by needle punching the at least one filter web and reinforcement scrim to form a filter web with substantially uniform basis weight and filter performance properties across the web.

2. The method of claim 1 wherein the fibers have substantially rectangular cross-sections.

3. The method of claim 1 wherein the reinforcement scrim is an inner layer between two outer filter web layers.

4. The method of claim 1 wherein the at least one nonwoven filter web is formed by carding.

5. The method of claim 4 further comprising randomizing the carded filter web prior to joining with the scrim reinforcement.

6. The method of claim 1 wherein the fiber is a polypropylene polymer or copolymer fiber and the scrim reinforcement is a spunbond polypropylene polymer or copolymer nonwoven.

7. A uniform electret nonwoven filter comprising at least one nonwoven filter web of electrostatically charged dielectric fibrillated fibers formed by fibrillation of an electrostatically charged film joined to a reinforcement scrim by needle punching.

8. The electret nonwoven filter of claim 7 wherein the fibers are polypropylene polymers or copolymers.

9. The electret nonwoven filter of claim 7 wherein the reinforcement scrim is a center layer between two outer layers of the nonwoven filter web.

10. The electret nonwoven filter of claim 7 wherein the nonwoven filter web is a carded web.

11. The electret nonwoven filter of claim 10 wherein the nonwoven filter web is randomized.

12. The electret nonwoven filter of claim 7 wherein the nonwoven web material has a total basis weight of less than 120 gm/m$^2$.

* * * * *

UNITED STATES PATENT AND TRADEMARK OFFICE
CERTIFICATE OF CORRECTION

PATENT NO. : 5,230,800
DATED : July 27, 1993
INVENTOR(S) : David L. Nelson

It is certified that error appears in the above-identified patent and that said Letters Patent is hereby corrected as shown below:

Column 4  line 22, delete "76" and insert
--7--.

Signed and Sealed this

Nineteenth Day of April, 1994

Attest:

BRUCE LEHMAN

Attesting Officer    Commissioner of Patents and Trademarks